United States Patent [19]

Hrovat et al.

[11] Patent Number: 4,562,017

[45] Date of Patent: Dec. 31, 1985

[54] PROCESS FOR THE PRODUCTION OF CERAMIC FUEL TABLETS

[75] Inventors: Milan Hrovat, Rodenbach; Hans Huschka; Lothar Rachor, both of Hanau; Dieter Vollath, Stutensee, all of Fed. Rep. of Germany

[73] Assignee: Nukem GmbH, Hanau, Fed. Rep. of Germany

[21] Appl. No.: 532,151

[22] Filed: Sep. 14, 1983

[30] Foreign Application Priority Data

Sep. 23, 1982 [DE] Fed. Rep. of Germany ....... 3235207

[51] Int. Cl.$^4$ .............................................. G21C 21/00
[52] U.S. Cl. ...................................... 264/0.5; 252/643
[58] Field of Search ......................... 252/643; 264/0.5

[56] References Cited

U.S. PATENT DOCUMENTS

| | | | |
|---|---|---|---|
| 4,024,209 | 5/1977 | Ballard et al. | 264/0.5 |
| 4,152,395 | 5/1979 | Börner et al. | 423/16 |
| 4,174,938 | 11/1979 | Cellier | 264/0.5 X |
| 4,271,102 | 6/1981 | Hrovat et al. | 264/0.5 |
| 4,382,048 | 5/1983 | Harlow | 264/0.5 |

*Primary Examiner*—Leland A. Sebastian
*Attorney, Agent, or Firm*—Cushman, Darby & Cushman

[57] ABSTRACT

There is described a process for the production of ceramic fuel pellets which contain fission and/or fertile material in oxidized form, by heating porous green fuel pellets in a reducing atmosphere to a temperature below 2500° C., molding in a die, ejecting from the die and cooling the finished pellets. Thereby the heating and cooling is carried out stepwise whereby the heating and cooling speed below 1200° C. is less than 30° C./second and above 1200° C. is greater than 30° C./second.

23 Claims, No Drawings

PROCESS FOR THE PRODUCTION OF CERAMIC FUEL TABLETS

BACKGROUND OF THE INVENTION

The invention is directed to a process for the production of ceramic fuel pellets which contain the fission and/or breeder (fertile) material in oxidized form by heating corresponding green premolded pellets to a temperature below 2500° C., quickly transferring them into a steel die, impact compressing at a molding pressure below 1000 MN/m² within a few milliseconds, ejecting the pellets and cooling.

The fuel elements for light water (LWR) and fast breeden sodium cooled reactors (LMFBR) contain the fuel and/or fertile material predominantly in the form of pellets made of uranium oxide or a mixture of uranium oxide and plutonium oxide. The fission material plutonium is preponderantly used in SNR reactors; however, it is also employed in limited amounts in the LWR reactors in place of $U^{235}$.

The fuel pellets are customarily produced from uranium oxide powder ($UO_2$) or a mixture of powdered oxides $UO_2$ and $PuO_2$ by molding, sintering, and grinding. These molding-sintering processes have a number of disadvantages. The geometric density of the fuel tablets after the molding is small and limited by the maximum permissible pressure of 500 to 1000 MN/m² of the work piece to less than 70% of the theoretical density. Consequently, an expensive post densification by sintering is necessary. In order to guarantee the quality of the sintered pellets reproducibly, there were placed high requirements on the molding powder in regard to the purity and sinterability, which only could be fulfilled by expensive conversion processes in the production of $UO_2$ or $UO_2/PuO_2$ molding powders (e.g., German Pat. No. 1592468, German AS No. 1592477, or German OS No. 2623977 and related Börner U.S. Pat. No. 4,152,395). As a result, the presses used and the sintering furnace which is about 13 meters long require a lot of space.

Especially in the processing of plutonium containing fuel the boxing in of large apparatuses is expensive and associated with high costs of maintenance, supervision, and operation.

The diameter tolerances of the fuel pellets are ±25 μm. In order to maintain this, all pellets after the sintering are circular to the required dimensions. The loss of weight in the grinding is 2 to 4%. Besides, there cannot be avoided waste of about 10% through breakage of edges and through spalling.

The processing above all of the plutonium containing grits has been found to be most difficult and is associated with a very high expense.

The sintered fuel pellets in the reactor are frequently inclined to post sintering. The post densification connected therewith contributes to enlarging the heat checking split between the pellets and the fuel tubes and therewith the heat transfer is deteriorated. Furthermore, the reactivity in the reactor nucleus as a result of increased temperature is unfavorable.

Besides the preparation of fuel pellets, according to the molding-sintering process, there have been attempts to produce the fuel pellets by hot presses. At the required temperatures of more than 1300° C., however, the work material problems for the mold and die could not be solved economically. The changes in dimension tolerances producible thereby nevertheless require an expensive post processing. Therefore, this process has not acquired any industrial significance.

In order to solve the work material problems created by the presses at high temperature and pressure, there has been proposed the manufacture of the fuel pellets according to a hot impact compression process (HSV process) (German Pat. No. 2842402 and related Hrovat U.S. Pat. No. 4,271,102). In the HSV process, an green pellet capable of being handled is heated to a temperature above 1300° C. and compressed and shaped in a cold die so fast that there cannot occur any mentionable heat exchange between the pellet and tool. An essential feature of the process is that heat and pressure, in contrast to other hot pressing processes, are substantially deconpled, effecting the pellet jointly for a very short time (about one millisecond).

Through this, all interactions between pellet and tool which require a certain period of time are avoided. The pellet leaves the die while it is still in the plastic temperature region; however, it must have the required form stability in order to withstand without damage the dynamic stresses of the ejection process. The compressive stress as a result of the build up pressure by heating up in the densification of the porous pellets proves to be of the utmost importance in this process. In order to avoid it, it is necessary to carry out the heating densification and ejection of the pellets in a vacuum. According to this process, carbidic fuel tablets (UC and UC/PuC) are produced without problem.

In contrast, in the production of oxide fuel pellets, there occur a number of difficulties. The two oxides $UO_2$ and $PuO_2$ under the same conditions compared to uranium and plutonium carbide have a higher vapor pressure by a factor of about 500. Therefore, there occurs in the vacuum such a high rate of vaporization that it is not possible to use the HSV process industrially without modification. Besides, since the vapor pressure of $PuO_2$ is substantially higher than that of $UO_2$, there can occur at relatively high vaporization mate a selective enrichment of the $PuO_2$ component in the vapor phase, and therewith a segregation of uranium and plutonium in the pellets. The vaporized oxide condenses on the cold places in the heating oven and prevents the conveyance of the pellets.

Furthermore, the relatively high thermoshock sensitivity of oxidic fuel in the heating and cooling steps leads to numerous shrinkage cracks in the inside of the pellets.

The invention, therefore, is based on the problem of developing a process for the production of ceramic fuel pellets which contain the fission and/or fertile material in oxidic form, by heating corresponding crude pellets to a temperature below 2500° C., quickly transferring them into a steel die, impact compressing at a pressing pressure below 1000 MN/m² within a few milliseconds, ejecting the pellets and cooling in which no segregation and deposition of vaporized oxide occurs in the furnace, and above all no shrinkage cracks in the inside of the tablets.

SUMMARY OF THE INVENTION

This problem was solved according to the invention by carrying out the heating, compressing, and cooling in a reducing atmosphere and carrying out the heating and cooling stepwise, whereby the heating and cooling rate below 1200° C. is less than 30° C./second and above 1200° C. is greater than 30° C./second.

Preferably, the gas pressure of the reducing atmosphere is 10 to 1000 mbar, whereby a pressure of about 950 mbar has proven the best. Advantageously, there is used an inert gas-hydrogen mixture, especially helium having 4 to 10 volume % of hydrogen.

In this process, it is decisive that on the one hand in the stepwise heating the gas contained in the porous green pellets with increasing temperature can escape up to about 80% (based on the normal conditions at room temperature). Through extremely small vaporization losses in the heating and through the possibility of reducing the pressure requirements in the compression to such an extent that the pellets can withstand the ejection process uninjured, there is provided by the process of the invention the prerequisites for the industrial preparation of oxidic fuel pellets without shrinkage cracks occurring inside the pellets. In order to complete the escape of gas despite a relatively quick heating rate, it is most advantageous to use in the processing of the green fuel pellets a powder having the smallest possible sintering activity. The pellets produced with such a powder are gas permeable and are not inclined to changes in porous structure during the heating. They are substantially dimensionally stable. Ground sinter scrap and a powder produced through a thermal decomposition of uranyl nitrate or uranyl nitrate-plutonium nitrate have proven particularly good. It is advantageous for the better establishment of the heavy metal-oxygen ratio to use as the reducing agent for the reducing atmosphere hydrogen having a small addition of water vapor (steam if the temperature is above 100° C.).

Generally, ceramic materials having lower heat conductivity are substantially more thermoshock sensitive than metals or metal allows. The thermoshock sensitivity is markedly especially strong with the $UO_2$ of $UO_2$-$PuO_2$ fuel pellets in the temperature region below 1200° C. The optimization experiments with $UO_2$ and $UO_2$-$PuO_2$ pellets show that the heating and cooling rates in the temperature region below 1200° C. should be limited to values between 1° C. and 30° C./second, preferably about 12° C./second, while they can be raised in the temperature region above 1200° C. from 30° C. to up to 100° C./second, preferably about 50° C./second, without fissures or cracks forming through impermissibly high thermal stresses. Through the increased rate of heating, the residence time of the pellets in the upper temperature region is shortened, and therewith the vaporization of the oxide already suppressed through the pressure of the reducing atmosphere is still further reduced.

The process of the invention can comprise, consist essentially of, or consist of the stated steps with the recited materials.

The following examples explain the process in greater detail.

EXAMPLE 1

Production of $UO_2$ Fuel Pellets

As starting powder for the production of pellets, there was employed comminuted $UO_2$ sinter scrap having a grain size d<63 μm, a BET surface area of 0.1 $m^2/g$, a bulk density of 4.2 $g/cm^3$, and an O/U ratio of 2.01. From the powder at a pressing pressure of 450 $MN/m^2$, there were pressed pellets having a height of 8.6 mm and diameter of 5.9 mm. The density of the green pellets was 8.8 $g/cm^3$, which corresponds to a theoretical density value of 80.3%. The green pellets were heated to 2200° C. in a helium-hydrogen atmosphere having 500 ppm of water vapor. The gas pressure of the reducing atmosphere was 950 mbar. In the temperature region below 1200° C., the heating speed was 12° C./second, while in the upper temperature region between 1200° and 2200° C., it was increased on the average to 50° C./second. The pellets heated to 2200° C. were transferred at an upper die speed of 5.7 meters/seconds into a cold die, compressed therein to final dimensions and ejected. Thereby, they fell through a furnace in which they were controllably cooled, whereby the cooling speed above 1200° C. was 50° C./second, and below 1200° C. was 20° C./second.

The pressure-time-pattern of the compression process was determined with the help of strain ganges bondes to the upper piston and measured with a recording oscillograph.

At a maximum pressure of 450 $MN/m^2$, the duration of compression was 1.2 milliseconds. The pellets cooled to room temperature had a diameter of 5.86 mm and a height of 7.3 mm. The density was 10.54 $g/cm^3$, which corresponds to 96.17% of the theoretical density.

The U/O ratio was 2.00. It was crack free, and its decrease in weight within the precision of the test was about 0.1 μg.

EXAMPLE 2

Production of $UO_2$-$PuO_2$ Fuel Pellets

The pressing powder mixture was produced through thermal decomposition of a uranyl nitrate-plutonium nitrate solution and subsequent calcination and reduction of the heavy metal oxide to $UO_2$-$PuO_2$ powder. At a U/Pu ratio of 70:30, the heavy metal concentration of the uranyl-plutonium nitrate solution was 400 g/l. Up to the lowering of the pressing temperature in the hot impact compression to 2000° C., all the remaining production steps remained unchanged compared to Example 1. The finished pellets had a diameter of 5.88 mm and a height of 7.8 mm.

The density was 10.1 $g/cm^3$ which corresponds to 93.6% of the theoretical density. These pellets also were crack free. There could not be detected a decrease in weight. The tests on dissolving in 6 n $HNO_3$ according to standard conditions showed a very good solubility. It was 99.98 wt.%, based on $PuO_2$.

What is claimed is:

1. In a process for the production of ceramic fuel pellets which contain fission material, fertile material, or a mixture of fission material and fertile material in oxidic form by heating corresponding green premolded pellets to a temperature below 2500° C. and above 1200° C., quickly transferring into a die, impact compressing at a molding pressure below 1000 $MN/m^2$ within a few milliseconds, ejecting the pellets and cooling, the improvement comprising carrying out the heating, compressing, ejecting, and cooling in a reducing atmosphere and carrying out the heating and cooling stepwise wherein the heating and cooling rate below 1200° C. are less than 30° C./second and above 1200° C. is greater than 30° C./second.

2. A process according to claim 1 wherein oxidic material employed comprises $UO_2$ or $UO_2$ and $PuO_2$.

3. A process according to claim 1 wherein the gas pressure in the reducing atmosphere is between 10 and 1000 mbar.

4. A process according to claim 3 wherein the gas pressure in the reducing atmosphere is about 950 mbar.

5. A process according to claim 4 wherein the reducing atmosphere consists essentially of inert gas and hydrogen.

6. A process according to claim 3 wherein the reducing atmosphere consists essentially of inert gas and hydrogen.

7. A process according to claim 1 wherein the reducing atmosphere consists essentially of inert gas and hydrogen.

8. A process according to claim 7 wherein the reducing atmosphere consists essentially of a helium-hydrogen mixture containing 4 to 10 vol.% hydrogen.

9. A process according to claim 6 wherein the reducing atmosphere consists essentially of a helium-hydrogen mixture containing 4 to 10 vol.% hydrogen.

10. A process according to claim 5 wherein the reducing atmosphere consists essentially of a helium-hydrogen mixture containing 4 to 10 vol.% hydrogen.

11. A process according to claim 10 wherein the inert gas-hydrogen mixture also contains water vapor.

12. A process according to claim 3 wherein the inert gas-hydrogen mixture also contains water vapor.

13. A process according to claim 12 wherein the heating and cooling rate at a temperature up to 1200° C. is about 12° C./second and at a temperature above 1200° C. is about 50° C./second.

14. A process according to claim 11 wherein the heating and cooling rate at a temperature up to 1200° C. is about 12° C./second and at a temperature above 1200° C. is about 50° C./second.

15. A process according to claim 10 wherein the heating and cooling rate at a temperature up to 1200° C. is about 12° C./second and at a temperature above 1200° C. is about 50° C./second.

16. A process according to claim 9 wherein the heating and cooling rate at a temperature up to 1200° C. is about 12° C./second and at a temperature above 1200° C. is about 50° C./second.

17. A process according to claim 8 wherein the heating and cooling rate at a temperature up to 1200° C. is about 12° C./second and at a temperature above 1200° C. is about 50° C./second.

18. A process according to claim 7 wherein the heating and cooling rate at a temperature up to 1200° C. is about 12° C./second and at a temperature above 1200° C. is about 50° C./second.

19. A process according to claim 6 wherein the heating and cooling rate at a temperature up to 1200° C. is about 12° C./second and at a temperature above 1200° C. is about 50° C./second.

20. A process according to claim 5 wherein the heating and cooling rate at a temperature up to 1200° C. is about 12° C./second and at a temperature above 1200° C. is about 50° C./second.

21. A process according to claim 4 wherein the heating and cooling rate at a temperature up to 1200° C. is about 12° C./second and at a temperature above 1200° C. is about 50° C./second.

22. A process according to claim 3 wherein the heating and cooling rate at a temperature up to 1200° C. is about 12° C./second and at a temperature above 1200° C. is about 50° C./second.

23. A process according to claim 1 wherein the heating and cooling rate at a temperature up to 1200° C. is about 12° C./second and at a temperature above 1200° C. is about 50° C./second.

* * * * *